United States Patent [19]
Tallman et al.

[11] Patent Number: 5,311,295
[45] Date of Patent: May 10, 1994

[54] RGB DISPLAY OF A TRANSCODED SERIAL DIGITAL SIGNAL

[75] Inventors: James L. Tallman, Beaverton; Gerald Sargeant, Portland, both of Oreg.

[73] Assignee: Tektronix, Inc., Wilsonville, Oreg.

[21] Appl. No.: 44,789

[22] Filed: Apr. 12, 1993

[51] Int. Cl.$^5$ ............................................. H04N 17/02
[52] U.S. Cl. .................................................... 348/180
[58] Field of Search .................... 358/10; H04N 17/02

[56] References Cited

U.S. PATENT DOCUMENTS

| | | | |
|---|---|---|---|
| 4,707,727 | 11/1987 | Penney | 358/10 |
| 5,122,863 | 6/1992 | Zortea | 358/10 |
| 5,166,791 | 11/1992 | Crawford | 355/10 X |

*Primary Examiner*—Mark R. Powell
*Attorney, Agent, or Firm*—Francis I. Gray

[57] ABSTRACT

An RGB display of a transcoded serial digital video signal is produced by converting the serial digital video signal to a parallel digital video signal, separating the digital luminance component signal and the two digital difference component signals from the parallel digital video signal, converting the digital luminance and color difference component signals into analog encoded color component signals, transcoding the analog encoded color component signals into RGB component signals, and routing the RGB component signals to a waveform display device. The RGB component signals also are routed to a gamut detection circuit where each component is compared with nominal plus and minus limit levels to determine if there is a gamut error. Color gamut for each RGB component signal may be determined visually from the display, either from the screen graticules or from voltage cursors, or may be determined automatically by varying the plus and minus limit levels from nominal levels for each RGB component signal which has a color gamut error until the gamut error is extinguished. The differences between the final limit levels and the nominal limit levels for each RGB component signal are a measure of the amount of gamut errors.

4 Claims, 2 Drawing Sheets

RGB DISPLAY OF A TRANSCODED SERIAL DIGITAL SIGNAL

BACKGROUND OF THE INVENTION

The present invention relates to waveform display instruments, and more particularly to an RGB display of a transcoded serial digital signal for the purpose of quantifying color gamut errors.

In a color display device, such as a shadow mask cathode ray tube (CRT) display, a video signal for display has three primary color components, such as red, green and blue (RGB). The display device is adjusted so that a minimum valid value of any one of the three components drives the corresponding electron gun to a minimum, or perceived off, condition and a maximum valid value drives the corresponding electron gun to maximum brightness. These valid values typically range between zero and 0.7 volts, and may be normalized arbitrarily to be between zero and 1.0. The primary color components (RGB) generally are derived from encoded luminance and color difference components ($Y$, $P_b$, $P_r$) using a resistive network. The encoded components are in turn derived from a composite video signal, such as a signal in accordance with the analog NTSC or PAL formats or the serial digital CCIR-601 format. In a digital suite digital is commonly used to reduce the number of wires required to route the video signal from one piece of equipment to another.

For many years the only significant source of a video signal was a video camera that provided the primary color components RGB. The RGB was then encoded into the color component signals $Y$, $P_b$, $P_r$ and combined to produce the composite video signal in NTSC or PAL formats. However it is now common to generate the composite video signals from other sources than the primary color components RGB. Such sources, such as television graphics systems, may generate signals directly in the encoded color component domain. Also these encoded color components are the form in which video signal processing commonly is performed. The result is that when these encoded color components are transformed into the primary color component domain, the range or gamut of the individual primary colors may exceed the voltage range of zero to 0.7 volts. Values of the primary colors that are outside of the gamut may not be faithfully reproduced on the color display device, resulting in color distortion on the display.

One method of detecting this out-of-gamut condition, or gamut error, is disclosed in U.S. Pat. No. 4,707,727 issued Nov. 17, 1987 to Bruce J. Penney entitled "Apparatus for Providing an Indication That a Color Represented by a Y, R−Y, B−Y Color Television Signal is Validly Reproducible on an RGB Color Display Device" and incorporated into the WFM-300 Component Television Waveform Monitor manufactured by Tektronix, Inc. of Wilsonville, Oreg. The encoded color components are transformed into the primary color components and input to two sets of comparators, one set having as a reference level the maximum value and the other set having as a reference level the minimum value. The outputs of the comparators are input to an OR gate so that, if any one of the primary color components are above or below the maximum or minimum values, a gamut error signal is produced. The 500 Series Waveform Monitors/Vectorscopes manufactured by Magni Systems, Inc. of Beaverton, Oreg. provides a separate output for each comparator for display so that the primary color component and direction (plus or minus) of the gamut error is displayed.

Although the WFM-300 does display RGB component signals when the input is in that form, the WFM-300 does not display RGB component signals after being transformed from a video signal input in the encoded color component format. The WFM-300 does provide RGB output for a television monitor regardless of the input format. The problem is further compounded when the input video signal is in the CCIR-601 serial digital format. In order to display the digital input video signal, it is first transcoded into the encoded color component format. Once in the encoded color component format the video signal may be displayed as in the WFM-300.

What is desired is an RGB display of a transcoded serial digital video signal from which quantifiable gamut error may be derived.

SUMMARY OF THE INVENTION

Accordingly the present invention provides an RGB display of a transcoded serial digital video signal on a waveform display device so that gamut error may be quantified. A video signal in serial digital format, such as the CCIR-601 format, is input to a de-serializer and converted into a parallel digital format. The parallel digital video signal is then transcoded into analog encoded color components, such as luminance and two color difference signals ($Y$, $P_b$, $P_r$). The encoded color components are subsequently input to a resistive matrix that converts them into primary color components RGB. The RGB components are selectively routed to the waveform display device for display as individual waveforms for each component. Color gamut is determined by measuring the amplitudes of each RGB component waveform relative to specified maximum and minimum values. Such measurements may be made manually via graticule marks on the screen of the waveform display device or via a pair of voltage or amplitude cursors. Such measurements may also be made automatically by adjusting the maximum and minimum values from predetermined standard values until the gamut error disappears, the differences in the maximum and minimum values from the standard values being the measure of the gamut errors.

The objects, advantages and other novel features of the present invention are apparent from the following detailed description when read in conjunction with the appended claims and attached drawing.

DESCRIPTION OF THE PREFERRED EMBODIMENT

Figure 1:
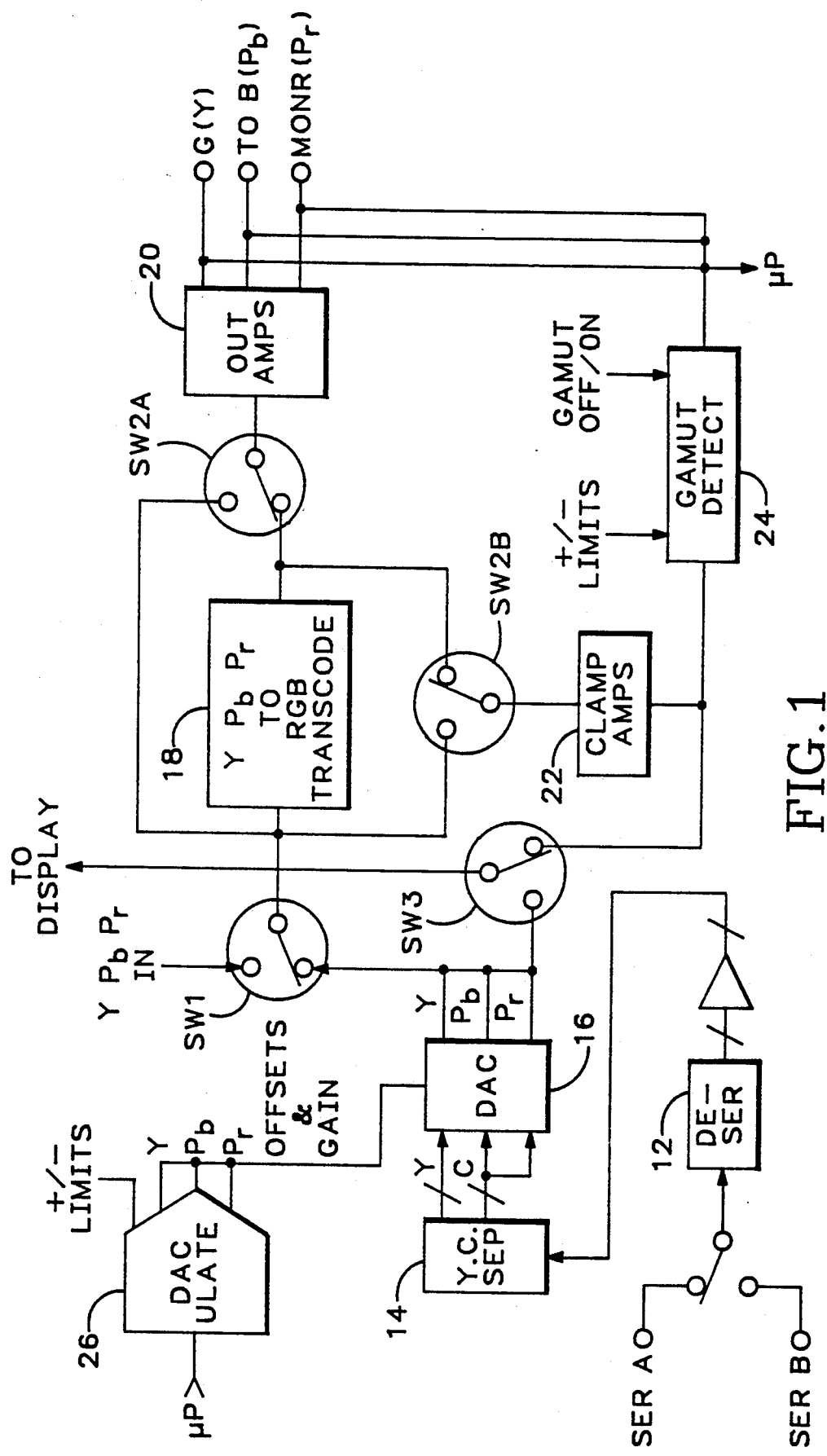
FIG. 1 is a partial block diagrammatic view of a waveform display device for providing an RGB display of a transcoded serial digital video signal according to the present invention.

Referring now to FIG. 1 a serial digital video signal, such as a CCIR-601 format signal, is input to a de-serializer circuit 12 that converts the serial digital video signal to a parallel digital video signal. The parallel digital video signal in turn is input to a decoder 14 that separates the parallel digital video signal into a luminance (Y) digital signal and a chrominance (C) digital signal. The luminance and chrominance digital signals are input to digital to analog converters (DAC) 16, with the chrominance digital signal being deinterlaced to produce two color difference component digital signals. The outputs from the DAC 16 are analog encoded color component signals (Y, Pb, Pr). The analog encoded color component signals are input via a first switch SW1 to a transcoder circuit 18. The outputs from the transcoder circuit 18 are the primary color component RGB signals. The RGB signals are input to two halves of a second switch SW2A, SW2B. The second switch SW2A, SW2B separately selects between the RGB signals and the encoded color component signals for input to picture output amplifiers 20 for display on a picture monitor and for input to clamping amplifiers 22. The position of the first half SW2A of the second switch is a function of the type of picture monitor coupled to the outputs of the picture output amplifiers 20. The position of the second half SW2B of the second switch is a function of the display setup of the waveform display device. The clamped RGB or encoded color component signals are input to a third switch SW3 and to a gamut detection circuit 24. The gamut detection circuit 24, when enabled, provides a gamut error output signal that is summed with the outputs from the picture output amplifiers 20 to provide a "bright up" display on the monitor where gamut errors occur. Alternatively the gamut error output signal may be summed with only one of the output signals from the picture output amplifiers 20, usually the green (G) or luminance (Y) output. The third switch SW3 selects between the clamped RGB or encoded color component signals and the encoded color component signals directly from the DAC 16. The output from the third switch SW3 is provided to the display electronics (not shown) for display as waveforms on a display device, such as a cathode ray tube (CRT). Typical displays involving component input signals are the parade and overlay displays, as is well known to those of ordinary skill in the art.

Figure 2A:
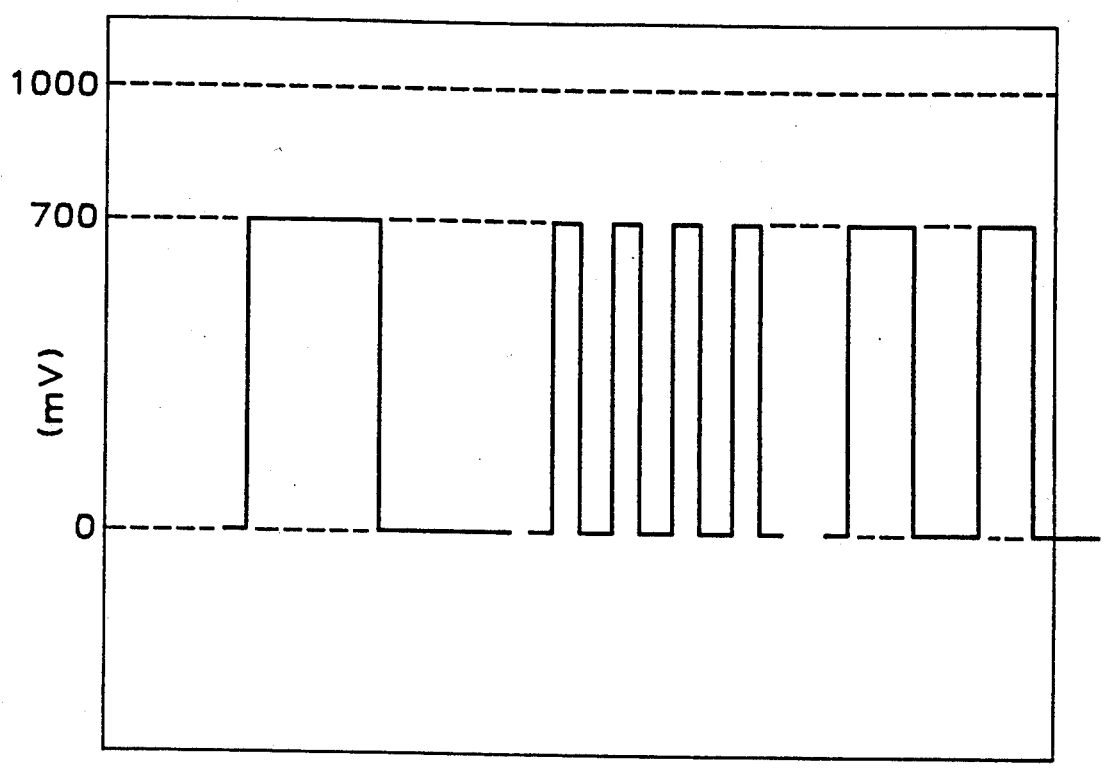
FIG. 2 illustrates (a) a normal RGB signal parade display in response to a standard color bar input signal according to the present invention, and (b) the same display in the presence of a gamut error.
Figure 2B:
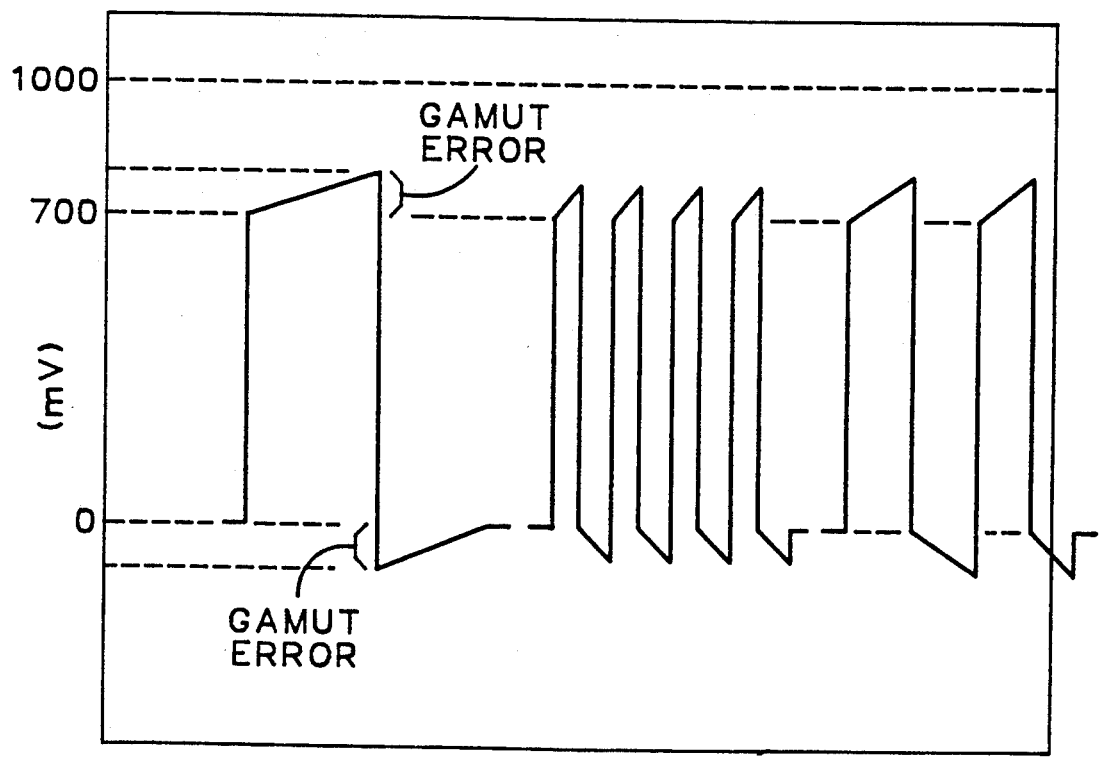

In operation for a CCIR-601 serial digital video signal at the input an operator sets up the waveform display device from a front panel according to the display desired. The front panel settings are input to a microprocessor (not shown) which generates the necessary timing, commands and parameter values to configure the waveform display device. A "daculator" 26 converts digital parameter values from the microprocessor into analog control voltages, such as offset and gain voltages for the DAC 16 and plus and minus limit voltages for the gamut detection circuit 24. With the switches SW1-SW3 positioned as shown in FIG. 1 a serial digital video input signal is converted and decoded into an analog encoded color component signal, which in turn is transcoded into the RGB component signal. The RGB component signal is routed to the picture monitor and to the display electronics for display as a waveform. As shown in FIG. 2(a) the RGB component signals for a color bar input signal in a parade display have a minimum value at zero volts and a maximum value at 700 millivolts. However when there is a gamut error the minimum and maximum values of the RGB component signals are less than zero volts and/or greater than 700 millivolts. By displaying the RGB component signals as waveforms, the amount and direction of the gamut errors are readily apparent. An operator may use the RGB component display with a video camera, for example, to adjust the RGB gains for the camera so as to eliminate gamut errors from that video source.

The amount of the gamut errors may be determined with even greater accuracy than from the display screen graticule by using voltage or amplitude cursors, as is well known to those of ordinary skill in the art. Finally the gamut error quantification may be automated by automatically determining the amount of the gamut error for each comparator in the gamut detection circuit 24. Initially the plus and minus limits for each comparator are set to be just slightly greater than 700 millivolts and just slightly less than zero volts. When a gamut error is detected, the gamut error output signal is provided to the microprocessor. The microprocessor in turn adjusts each limit for each comparator which indicates a gamut error until the gamut error output signal for that comparator ceases. The difference in value between the nominal limit level and the level required to extinguish the gamut error output signal is a measure of the gamut error.

Thus the present invention provides an RGB display of a transcoded serial digital video signal suitable for use in quantifying gamut errors in an input serial digital video signal by routing the RGB component signals derived from the serial digital video signal to the display electronics as well as to a gamut detection circuit, the amount of the gamut error being determined either visually, by using the screen graticules or by using voltage or amplitude cursors, or automatically by adjusting gamut levels until the gamut error is extinguished.

What is claimed is:

1. A method of determining color gamut errors in a serial digital video signal comprising the steps of:
   converting the serial digital video signal into an analog RGB component signal;
   routing the analog RGB component signal to a waveform display device for display as individual RGB waveform components; and
   measuring for each RGB waveform component the amount of deviation of the maximum and minimum values from predetermined maximum and minimum values that define a color gamut, the amount of deviation for each RGB waveform component being a measure of the color gamut errors.

2. The method as recited in claim 1 wherein the measuring step comprises the steps of:
   comparing each RGB waveform component with the predetermined maximum and minimum values set at standard color gamut levels to identify which RGB waveform component has a color gamut error;
   adjusting the predetermined maximum or minimum value for the identified RGB waveform component by a predetermined increment when the color gamut error is detected by the comparing step;
   repeating the comparing and adjusting steps until the identified RGB waveform component no longer indicates the color gamut error; and
   displaying the difference between the predetermined maximum and minimum values and the standard color gamut levels as the measure of the color gamut error.

3. An apparatus for determining color gamut errors in a serial digital video signal comprising:

means for converting the serial digital video signal into an analog RGB component signal;

means for routing the analog RGB component signal to a waveform display device for display as individual RGB waveform components; and means for measuring for each RGB waveform component the amount of deviation of the maximum and minimum values of each RGB waveform component from predetermined maximum and minimum values that define a color gamut, the amount of deviation for each RGB waveform component being a measure of the color gamut errors.

4. The apparatus as recited in claim 3 wherein the measuring means comprises:

means for comparing each RGB waveform component with the predetermined maximum and minimum values set at standard color gamut levels to identify which RGB waveform component has a color gamut error;

means for adjusting the predetermined maximum or minimum value for the identified RGB waveform component which has the color gamut error by a predetermined increment until the comparing means no longer indicates the color gamut error for the identified RGB waveform component; and means for determining the difference between the predetermined maximum and minimum values and the standard color gamut levels when the color gamut error is extinguished by adjustment of the predetermined maximum and minimum values for display as the measure of the color gamut error.

* * * * *